US012365092B2

(12) United States Patent
Hinze et al.

(10) Patent No.: US 12,365,092 B2
(45) Date of Patent: Jul. 22, 2025

(54) OPTICAL REGISTRATION IN A COMPUTER-AIDED SYSTEM

(71) Applicant: INTUITIVE SURGICAL OPERATIONS, INC., Sunnyvale, CA (US)

(72) Inventors: Brett A. Hinze, San Jose, CA (US); George D. Kamian, Scotts Valley, CA (US); Narayanan Ranganath, Sunnyvale, CA (US); James R. Stefani, Sunnyvale, CA (US)

(73) Assignee: INTUITIVE SURGICAL OPERATIONS, INC., Sunnyvale, CA (US)

( * ) Notice: Subject to any disclaimer, the term of this patent is extended or adjusted under 35 U.S.C. 154(b) by 421 days.

(21) Appl. No.: 17/893,029

(22) Filed: Aug. 22, 2022

(65) Prior Publication Data

US 2023/0054929 A1    Feb. 23, 2023

Related U.S. Application Data

(60) Provisional application No. 63/235,926, filed on Aug. 23, 2021.

(51) Int. Cl.
*B25J 9/16* (2006.01)
*B25J 13/08* (2006.01)
(Continued)

(52) U.S. Cl.
CPC ........... *B25J 9/1697* (2013.01); *B25J 9/1664* (2013.01); *B25J 13/089* (2013.01); *B25J 19/023* (2013.01); *G06T 7/38* (2017.01); *G06T 7/70* (2017.01)

(58) Field of Classification Search
CPC ...... B25J 9/1697; B25J 9/1664; B25J 13/089; B25J 19/023; G06T 7/38; G06T 7/70;
(Continued)

(56) References Cited

U.S. PATENT DOCUMENTS

| 6,681,151 B1 | 1/2004 | Weinzimmer et al. |
| 2014/0253684 A1 | 9/2014 | Kumar et al. |
| 2018/0204338 A1 | 7/2018 | Narang et al. |
| 2019/0038365 A1* | 2/2019 | Soper ..................... A61B 6/025 |

(Continued)

FOREIGN PATENT DOCUMENTS

| EP | 3600112 A1 | 2/2020 |
| WO | WO-2012158324 A2 | 11/2012 |

(Continued)

OTHER PUBLICATIONS

Vertut, J, and Coiffet, P., "Robot Technology: Teleoperation and Robotics Evolution and Development," English translation, Prentice-Hall, Inc., Inglewood Cliffs, NJ, USA 1986, vol. 3A, 332 pages.

*Primary Examiner* — Jason Holloway
(74) *Attorney, Agent, or Firm* — Artegis Law Group, LLC

(57) ABSTRACT

Systems and methods of optical registration in a computer-aided system includes a control system. The control system is configured to provide a first registration indicator having a first indicator pose in a workspace; determine a first robotic device pose in a robotic device reference frame; obtain a first image of the first registration indicator; determine, based on the first image, the first indicator pose in an imaging device reference frame; provide a second registration indicator having a second indicator pose in the workspace; determine a second robotic device pose in the robotic device reference frame; obtain a second image of the second registration indicator; determine, based on the second image, the second indicator pose in the imaging device reference frame; and determine a registration transform between the robotic device reference frame and the imaging device reference (Continued)

frame based on correspondences between the robotic device poses and the indicator poses.

20 Claims, 9 Drawing Sheets

(51) Int. Cl.
    *B25J 19/02*     (2006.01)
    *G06T 7/38*     (2017.01)
    *G06T 7/70*     (2017.01)

(58) Field of Classification Search
    CPC . G06T 2207/30204; G06T 2207/30244; G06T 7/73; G05B 2219/39008
    See application file for complete search history.

(56) References Cited

U.S. PATENT DOCUMENTS

| | | |
|---|---|---|
| 2020/0016757 A1 | 1/2020 | Sakuramoto |
| 2020/0060767 A1 | 2/2020 | Lang |
| 2020/0073358 A1* | 3/2020 | Dedkov ............... B25J 9/1666 |
| 2020/0297427 A1* | 9/2020 | Cameron ............. A61B 90/14 |
| 2022/0249180 A1* | 8/2022 | Redmond ............. A61B 34/30 |
| 2022/0254040 A1* | 8/2022 | Datteri ................. G06T 3/14 |
| 2023/0074362 A1* | 3/2023 | Datteri ............... G06V 40/165 |
| 2023/0390021 A1* | 12/2023 | Polchin ............... A61B 90/25 |

FOREIGN PATENT DOCUMENTS

| | | |
|---|---|---|
| WO | WO-2018129532 A1 | 7/2018 |
| WO | WO-2019099346 A2 | 5/2019 |
| WO | WO-2020086345 A1 | 4/2020 |
| WO | WO-2021141920 A1 | 7/2021 |
| WO | WO-2021173541 A1 | 9/2021 |
| WO | WO-2021194895 | 9/2021 |

\* cited by examiner

OPTICAL REGISTRATION IN A COMPUTER-AIDED SYSTEM

RELATED APPLICATIONS

This application claims the benefit of U.S. Provisional Application No. 63/235,926, filed Aug. 23, 2021, and entitled "Optical Registration in a Computer-aided System," which is incorporated by reference herein.

BACKGROUND

Field of the Various Embodiments

The present disclosure relates generally to operation of computer-aided systems, and more particularly to determining a registration in a computer-aided system.

Description of the Related Art

More and more operations are being performed by computer-aided systems. This is true in industrial, entertainment, educational, and other settings. As an industrial example, an assembly line can include robots at different stages of an assembly process. The robots can perform various tasks in the assembly process with or without human intervention.

These computer-aided systems are useful for performing operations and/or procedures on materials, such as parts being assembled in an assembly line or on tissue of a patient in a medical example, that are located in a workspace. When a computer-aided system controls a device, such as a robotic device, based on visual guidance, the computer-aided system can use one or more images of the workspace for that visual guidance.

When controlling devices based on visual guidance, the computer-aided system often needs to translate data or commands between different reference frames of different pieces of equipment. For example, the computer-aided system can use the geometric relationships between an imaging reference frame of an imaging device of the computer-aided system and a device reference frame of a device that the computer-aided system is commanding. For example, such geometric relationships may comprise one or more transforms between the reference frames of the imaging device and one or more robotic device(s) commanded by the computer-aided system. Obtaining such geometric relationships for deriving transforms between reference frames of different pieces of equipment may be referred to as "registration."

Accordingly, it would be advantageous to have methods and systems to establish registration more effectively or efficiently between equipment, such as between an imaging device and a device being controlled, using for guidance images from the imaging device.

SUMMARY

Consistent with some embodiments, a computer-aided system includes an imaging device, a robotic device, and a control system comprising one or more processors. The control system is configured to provide, using the robotic device, a first registration indicator separate from the robotic device and having a first indicator pose in a workspace; determine a first robotic device pose of a portion of the robotic device in a robotic device reference frame of the robotic device, the first robotic device pose corresponding to the first indicator pose; obtain, using the imaging device, a first image of the first registration indicator; determine, based on the first image, the first indicator pose in an imaging device reference frame of the imaging device; provide, using the robotic device, a second registration indicator separate from the robotic device and having a second indicator pose in the workspace; determine a second robotic device pose of the portion of the robotic device in the robotic device reference frame, the second robotic device pose corresponding to the second indicator pose; obtain, using the imaging device, a second image of the second registration indicator; determine, based on the second image, the second indicator pose in the imaging device reference frame; and determine a registration transform between the robotic device reference frame and the imaging device reference frame based on a first correspondence between the first robotic device pose in the robotic device reference frame and the first indicator pose in the imaging device reference frame, and a second correspondence between the second robotic device pose in the robotic device reference frame and the second indicator pose in the imaging device reference frame.

Consistent with some embodiments, a control system for a computer-aided system, includes a robotic device and an imaging device. The control system further includes a robotic device pose command module configured to command the robotic device to provide a plurality of registration indicators separate from the robotic device and viewable by the imaging device, wherein each registration indicator of the plurality of registration indicators has an indicator pose; a robotic device pose determination module configured to determine a plurality of robotic device poses of a portion of the robotic device in a robotic device reference frame of the robotic device, wherein each robotic device pose of the plurality of robotic device poses corresponds to a registration indicator of the plurality of registration indicators; an image receipt module configured to receive, from the imaging device, one or more images of each registration indicator of the plurality of registration indicators; an indicator pose determination module configured to, based on the one or more images of each registration indicator of the plurality of registration indicators, determine a plurality of indicator poses in an imaging device reference frame of the imaging device, each indicator pose of the plurality of indicator poses corresponding to a registration indicator of the plurality of registration indicators; and a registration module configured to determine a registration transform between the robotic device reference frame and the imaging device reference frame based on correspondences between the plurality of robotic device poses in the robotic device reference frame and the plurality of indicator poses in the imaging device reference frame.

Consistent with some embodiments, a method performed by a control system includes providing, using a robotic device, a first registration indicator separate from the robotic device and having a first indicator pose in a workspace; determining a first robotic device pose of a portion of the robotic device in a robotic device reference frame of the robotic device, the first robotic device pose corresponding to the first indicator pose; obtaining, using an imaging device, a first image of the first registration indicator; determining, based on the first image, the first indicator pose in an imaging device reference frame of the imaging device; providing, using the robotic device, a second registration indicator separate from the robotic device and having a second indicator pose in the workspace; determining a second robotic device pose of the portion of the robotic device in the robotic device reference frame, the second robotic device pose corresponding to the second indicator pose; obtaining, using the imaging device, a second image of the second registration indicator; determining, based on the second image, the second indicator pose in the imaging device reference frame; and determining a registration transform between the robotic device reference frame and the imaging device reference frame based on a first correspondence between the first robotic device pose in the robotic device reference frame and the first indicator pose in the imaging device reference frame, and a second correspondence between the second robotic device pose in the robotic device reference frame and the second indicator pose in the imaging device reference frame.

Consistent with some embodiments, a method includes causing, by a control system, a robotic device to provide a plurality of registration indicators separate from the robotic device and viewable by an imaging device, wherein each registration indicator of the plurality of registration indicators has an indicator pose; determining, by the control system, a plurality of robotic device poses of a portion of the robotic device in a robotic device reference frame of the robotic device, wherein each robotic device pose of the plurality of robotic device poses corresponds to a registration indicator of the plurality of registration indicators; receiving, from the imaging device by the control system, one or more images of each registration indicator of the plurality of registration indicators; determining, by the control system based on the one or more images of each registration indicator of the plurality of registration indicators, a plurality of indicator poses in an imaging device reference frame of the imaging device, each indicator pose of the plurality of indicator poses corresponding to a registration indicator of the plurality of registration indicators; and determining, by the control system, a registration transform between the robotic device reference frame and the imaging device reference frame based on correspondences between the plurality of robotic device poses in the robotic device reference frame and the plurality of indicator poses in the imaging device reference frame.

Consistent with some embodiments, one or more non-transitory machine-readable media include a plurality of machine-readable instructions which when executed by one or more processors are adapted to cause the one or more processors to perform any of the methods described herein.

At least one advantage and technical improvement of the disclosed techniques is that registration between an imaging device and a robotic device, in particular an end effector of the robotic device, in a workspace environment can be performed even when the end effector is at least partially obscured from the imaging device and/or features of the end effector most relevant to the registration are facing away from the imaging device. Accordingly, registration between the imaging device and the robotic device can be performed with reduced or eliminated need to add additional physical components or complexity, thereby improving the ability to use the imaging device for other purposes associated with the workspace environment. Additionally, the need for significant additional or modified equipment, or physical reconfiguration of the workspace environment, to accommodate the registration process is reduced or eliminated. These technical advantages provide one or more technological advancements over prior art approaches.

BRIEF DESCRIPTION OF THE DRAWINGS

To aid in the understanding of the above recited features of the various embodiments, the inventive concepts are described in more detail below by reference to the various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

Figure 1:
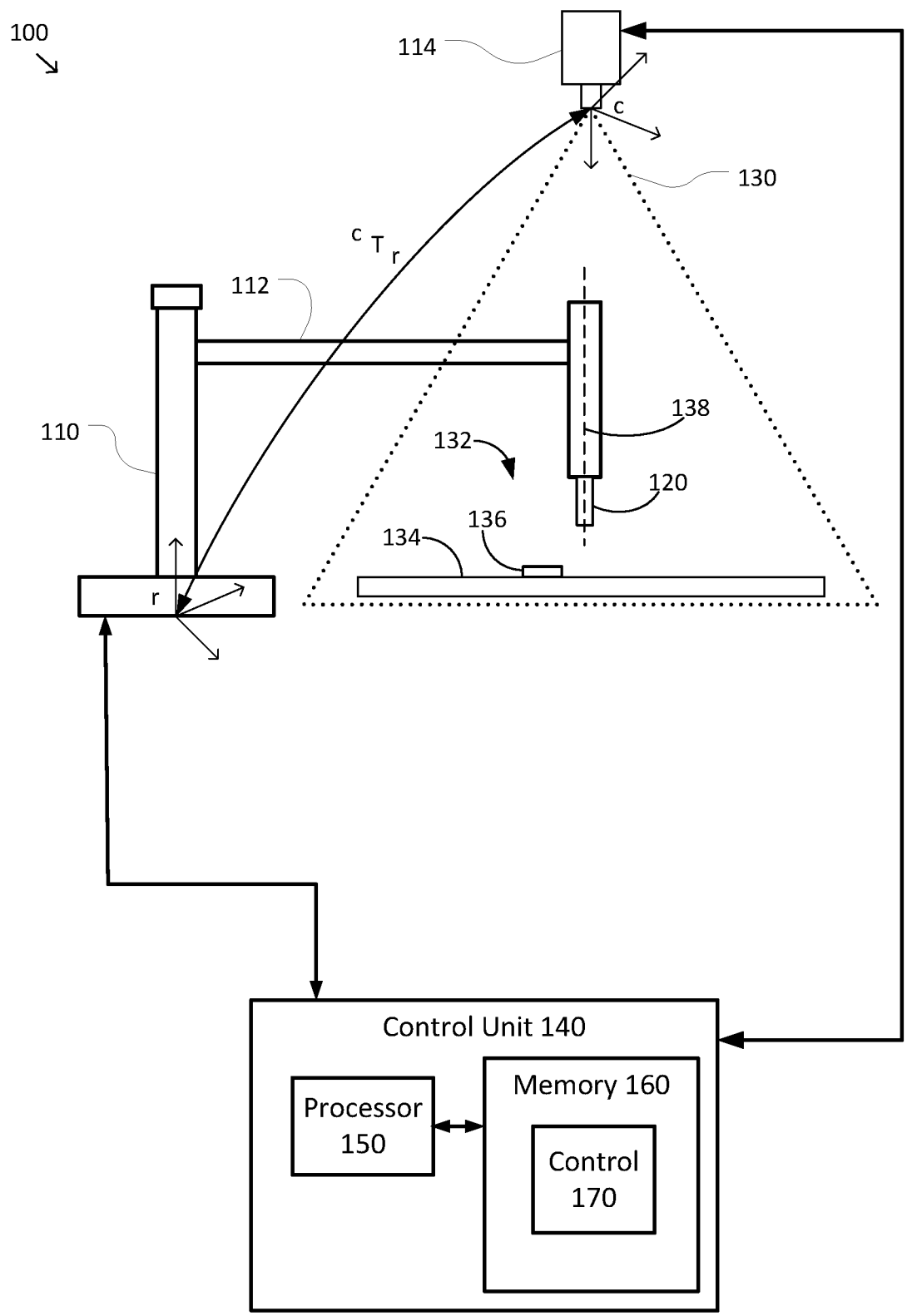
FIG. 1 is a simplified diagram of a computer-aided system according to some embodiments.

This description and the accompanying drawings that illustrate inventive aspects, embodiments, implementations, or modules should not be taken as limiting—the claims define the protected invention. Various mechanical, compositional, structural, electrical, and operational changes may be made without departing from the spirit and scope of this description and the claims. In some instances, well-known circuits, structures, or techniques have not been shown or described in detail in order not to obscure the invention. Like numbers in two or more figures represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Further, this description's terminology is not intended to limit the invention. For example, spatially relative terms-such as "beneath", "below", "lower", "above", "upper", "proximal", "distal", and the like-may be used to describe one element's or feature's relationship to another element or feature as illustrated in the figures. These spatially relative terms are intended to encompass different positions (i.e., locations) and orientations (i.e., rotational placements) of the elements or their operation in addition to the position and orientation shown in the figures. For example, if the content of one of the figures is turned over, elements described as "below" or "beneath" other elements or features would then be "above" or "over" the other elements or features. Thus, the exemplary term "below" can encompass both positions and orientations of above and below. A device may be otherwise oriented (rotated 90 degrees or at other orientations) and the spatially relative descriptors used herein interpreted accordingly. Likewise, descriptions of movement along and around various axes include various special element positions and orientations. In addition, the singular forms "a", "an", and "the" are intended to include the plural forms as well, unless the context indicates otherwise. And, the terms "comprises", "comprising", "includes", and the like specify the presence of stated features, steps, operations, elements, and/or components but do not preclude the presence or addition of one or more other features, steps, operations, elements, components, and/or groups. Components described as coupled may be electrically or mechanically directly coupled, or they may be indirectly coupled via one or more intermediate components.

Elements described in detail with reference to one embodiment, implementation, or module may, whenever practical, be included in other embodiments, implementations, or modules in which they are not specifically shown or described. For example, if an element is described in detail with reference to one embodiment and is not described with reference to a second embodiment, the element may nevertheless be claimed as included in the second embodiment. Thus, to avoid unnecessary repetition in the following description, one or more elements shown and described in association with one embodiment, implementation, or application may be incorporated into other embodiments, implementations, or aspects unless specifically described otherwise, unless the one or more elements would make an embodiment or implementation non-functional, or unless two or more of the elements provide conflicting functions.

In some instances, well known methods, procedures, components, and circuits have not been described in detail so as not to unnecessarily obscure aspects of the embodiments.

This disclosure describes various devices, elements, and portions of robotic devices and elements in terms of their state in three-dimensional space. As used herein, the term "position" refers to the location of an element or a portion of an element in a three-dimensional space (e.g., three degrees of translational freedom along Cartesian x-, y-, and z-coordinates). As used herein, the term "orientation" refers to the rotational placement of an element or a portion of an element (three degrees of rotational freedom—e.g., roll, pitch, and yaw, angle-axis, rotation matrix, quaternion representation, and/or the like). As used herein, and for a device with repositionable arms, the term "proximal" refers to a direction toward the base of the robotic device along its kinematic chain and "distal" refers to a direction away from the base along the kinematic chain. As used herein, the term "pose" refers to a combination of multiple degrees of freedom (DOF) identifying a position and/or orientation of a coordinate system, object, or marking of interest. In general, a pose includes a pose parameter for each of the DOFs in the pose. For example, a full 6-DOF pose for a rigid body in three-dimensional (3D) space includes 6 pose parameters corresponding to the 3 positional DOFs (e.g., x, y, and z) and the 3 orientational DOFs (e.g., roll, pitch, and yaw). In contrast, a 3-DOF position-only pose for a rigid body in 3D space would include only pose parameters for the 3 positional DOFs, and a 3-DOF orientation-only pose in 3D space would include only pose parameters for the 3 rotational DOFs. As another example, a planar pose for a rigid object in a plane includes 2-DOF position parameters and 1-DOF orientation parameter. Non-rigid bodies (e.g., pliable bodies, bodies with internal degrees of freedom) may have more DOFs.

As used herein, the term "feature" refers to a physical element on an implement, on an end effector, or on an object (e.g., a fiducial object). A feature can be a geometrical element, a functional element, and/or an ornamental element. A feature can be physically manufactured or formed (e.g., drilled, engraved, etched, attached, etc.) or otherwise applied (e.g., printed, drawn, written, applied as with a sticker) onto or into the implement, end effector, or object. A feature can have any regular, irregular, or arbitrary shape. Examples of features include, without limitation, a shape, a tab, a slot, an edge, a boundary, a hole, an opening, an indentation, a functional tool or element (e.g., an insertion tool), a representative structure such as a tool tip or a clevis pin, and/or the like. Other examples of features include one or more indicia (e.g., text, number, graphics, icons, scannable code, markings, and/or the like) applied onto the implement, end effector, or object. In various examples, any set of two or more features can form a pattern that can be recognized in images of the features.

Aspects of this disclosure are described in reference to computer-aided systems and devices, which may include systems and devices that are teleoperated, remote-controlled, autonomous, semiautonomous, controlled in some other manner, a combination of the foregoing, etc. Further, aspects of this disclosure are described in terms of an implementation using a computer-aided system. Knowledgeable persons will understand, however, that inventive aspects disclosed herein may be embodied and implemented in various ways, including other computer-aided embodiments and implementations. Implementations on any particular system, such as autonomous or teleoperated robotic systems, are merely exemplary and are not to be considered as limiting the scope of the inventive aspects disclosed herein. For example, techniques described with reference to manufacturing and assembly processes may be used in other contexts. Thus, the implements, systems, and methods described herein may be used for humans, animals, portions of human or animal anatomy, industrial systems, general robotic systems, or teleoperational systems. As further examples, the implements, systems, and methods described herein may be used for medical or non-medical purposes including industrial uses, general robotic uses, sensing or manipulating non-tissue work pieces, cosmetic improvements, imaging of and/or operation on human or animal anatomy, gathering data from human or animal anatomy, setting up or taking down systems, training medical or non-medical personnel, and/or the like. Additional example applications include use for procedures on tissue removed from human or animal anatomies (without return to a human or animal anatomy) and for procedures on human or animal cadavers. Further, these techniques can also be used for medical treatment or diagnosis procedures that include, or do not include, surgical aspects.

FIG. 1 is a simplified diagram of a computer-aided system 100 according to some embodiments. As shown in FIG. 1, computer-aided system 100 includes a robotic device 110.

Robotic device 110 includes a repositionable structure having a repositionable arm 112 configured to support an end effector 120. End effector 120 may correspond to a sensing or manipulation implement, or any other appropriate implement. In some examples, end effector 120 is capable of performing one or more tasks, such as contacting, suctioning, grasping, holding, translating, rotating, and/or releasing a material or object. In some examples, each of repositionable arm 112 and/or end effector 120 may include one or more joints and/or links. In some embodiments, robotic device 110 can also rotate end effector 120, about an axis 138. In some examples, robotic device 110 is a robotic manipulator controlled by a computer system (e.g., control unit 140).

Computer-aided system 100 also comprises an imaging device 114. In some examples, imaging device 114 is a monoscopic or stereoscopic camera, a still or video camera, a hyperspectral device, an infrared device, an ultrasonic device, and/or the like. In various examples, imaging device 114 captures images of a workspace 132 of end effector 120, such as one or more images of at least part of one or more work surfaces 134 or other areas (e.g., a component feeder area, a conveyor), one or more objects 136 in workspace 132 (e.g., a fiducial object on work surface 134), and/or the like. In some embodiments, computer-aided system 100 may be found in a manufacturing environment (e.g., an assembly line). According to some embodiments, imaging device 114 may be mounted to a ceiling, wall, and/or equipment physically separate from robotic device 110. According to various embodiments and as described further below, images of workspace 132 obtained by imaging device 114 may be used to determine a registration transform between robotic device 110 and imaging device 114.

FIG. 1 also shows various reference frames (which are shown in the form of coordinate systems in FIG. 1) that are useful in describing how the registration (including any associated transforms) is determined. Reference frame r (e.g., for "robotic device") corresponds to a base reference frame of robotic device 110. In some examples, reference frame r may have its origin located at a central point on a base of robotic device 110 and may be aligned with one or more major axes of robotic device 110. In some examples, the central point on the base of robotic device 110 may be on a level, planar surface on which robotic device 110 may be wheeled, slid, mounted, and/or otherwise repositioned. In some examples, a z-axis of reference frame r may correspond to a vertical up direction.

In some examples, reference frame r of robotic device 110 is configured to describe positions and/or orientations of one or more features on or near end effector 120 relative to a known fixed reference location or orientation on robotic device 110.

FIG. 1 also shows an imaging device reference frame c (e.g., for "camera") that may be used to describe positions and/or orientations of objects (e.g., object 136, end effector 120) in images captured by imaging device 114. In some examples, an origin of reference frame c may be located at a distal end of imaging device 114. In some examples, the origin of reference frame c may be located at a mid-point of an imaging plane associated with imaging device 114. In some examples, a z-axis of reference frame c may be oriented in a direction of view (e.g., field of view 130) of imaging device 114. In some examples, imaging device 114 may be a steerable imaging device and/or a repositionable imaging device, and reference frame c may be at or near a distal tip of imaging device 114. In some examples, the reference frame c may be not attached to a physical point and may be virtually coupled, rigidly or otherwise, to a reference point defined relative to imaging device 114.

In various examples, determining a registration transform $^{c}T_{r}$ between robotic device 110 and imaging device 114 includes determining a registration transform between reference frame r and reference frame c. More generally, the registration transform between robotic device 110 and imaging device 114 is determined such that end effector 120 and features thereon can be effectively controlled to move and/or to orient end effector 120 to a desired pose within workspace 132.

Robotic device 110 and imaging device 114 are both coupled to a control unit 140 via respective interfaces. Each of the respective interfaces may include one or more cables, connectors, and/or buses and may further include one or more networks with one or more network switching and/or routing devices. Control unit 140 includes a processor 150 coupled to memory 160. Operation of control unit 140 is controlled by processor 150. And although control unit 140 is shown with only one processor 150, it is understood that processor 150 may be representative of one or more central processing units, multi-core processors, microprocessors, microcontrollers, digital signal processors, field programmable gate arrays (FPGAs), application specific integrated circuits (ASICs), graphics processing units (GPUs), tensor processing units (TPUs), and/or the like in control unit 140. Control unit 140 may be implemented as a stand-alone subsystem and/or as a board added to a computing device or as a virtual machine.

Memory 160 can be used to store software executed by control unit 140 and/or one or more data structures used during operation of control unit 140. Memory 160 includes one or more types of machine-readable media. Some common forms of machine-readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

As shown, memory 160 includes a control module 170 that is responsible for controlling one or more aspects of the operations of robotic device 110 and imaging device 114 including, for example, the control of movement and/or operation of each of robotic device 110, repositionable arm 112, and/or end effector 120; controlling imaging device 114 to capture images; receiving and processing images captured by imaging device 114; determining a registration transform between robotic device 110 and imaging device 114; automatically controlling each of robotic device 110, repositionable arm 112, and/or end effector 120 based on the images from imaging device 114 and the registration transform; and/or the like as is described in further detail below. In some examples, control module 170 includes a robotic device pose command module configured to command robotic device 110 to provide a plurality of registration indicators viewable by imaging device 114, where each registration indicator of the plurality of registration indicators has an indicator pose; a robotic device pose determination module configured to determine a plurality of robotic device poses of a portion (e.g., end effector 120) of robotic device 110 in a robotic device reference frame (e.g., reference frame r) of robotic device 110, where each robotic device pose of the plurality of robotic device poses correspond to a registration indicator of the plurality of registration indicators; an image receipt module configured to receive, from imaging device 114, one or more images of each registration indicator of the plurality of registration indicators; an indicator pose determination module configured to, based on the one or more images of each registration indicator of the plurality of registration indicators, determine a plurality of indicator poses in an imaging device reference frame (e.g., reference frame c) of imaging device 114, each indicator pose of the plurality of indicator poses corresponding to a registration indicator of the plurality of registration indicators; and a registration module configured to determine a registration transform between the robotic device reference frame and the imaging device reference frame based on correspondences between the plurality of robotic device poses in the robotic device reference frame and the plurality of indicator poses in the imaging device reference frame. And although control module 170 is characterized as a software module, control module 170 may be implemented using software, hardware, and/or a combination of hardware and software.

As discussed above and further emphasized here, FIG. 1 is merely an example which should not unduly limit the scope of the claims. One of ordinary skill in the art would recognize many variations, alternatives, and modifications. According to some embodiments, computer-aided system 100 may include any number of robotic devices with corresponding repositionable arms and/or end effectors of similar or different in design from robotic device 110. In some examples, each of the robotic devices may include two, three, four, or more repositionable arms and/or end effectors.

According to some embodiments, each robotic device 110 may have separate control units similar to control unit 140. In some examples, each of the separate control units may be coupled to each other via an interface. The interface may include one or more cables, connectors, and/or buses and may further include one or more networks with one or more network switching and/or routing devices. In some examples, the separate control units may use the interface to share and/or exchange information about their respective robotic devices. In some examples, the exchanged information may include one or more sensor readings, mode indications, interrupts, state transitions, events, fault conditions, safety warnings, and/or the like. In some examples, the exchanged information may include one or more images captured by imaging device 114, information derived from the one or more images, calibration and/or configuration parameters specific to end effector 120, imaging device 114, and/or the like.

Vision-based registration includes determining the registration transform by mapping positions and/or orientations of features of an object (e.g., an end effector, the repositionable arm, a robotic device, a fiducial object, markings made on a medium in the workspace, and/or the like) as observed, extracted, or derived from one or more images of the object, and the positions and/or orientations of the features that are known or expected from control of the robotic device by a control unit (e.g., position and/or orientation of end effector 120 and/or one or more features on end effector 120 as controlled by control unit 140). In some examples, the registration transform includes a transform for a central axis of robotic device 110 (e.g., axis 138) and a transform for each of one or more individual features on end effector 120. A transform for an axis or a feature can comprise a transform from a first frame of reference to a frame of reference of the axis or feature. In some implementations, such as to reduce error or to increase precision or for some other reason, the registration transform is often chosen as the registration transform that minimizes some cost function (e.g., an aggregate error, such as L2error) between the visually extracted features and the known/expected features when the registration transform is used to map the visually extracted features and the expected positions and/or orientations of the corresponding features to a common reference frame. Examples of registration techniques are described in greater detail in commonly-owned International Patent Application No. PCT/US2019/056443 (filed Oct. 16, 2019, and disclosing "Systems and Methods for Master/Tool Registration and Control for Intuitive Motion") and International Patent Application No. PCT/US2021/012213 (filed Jan. 5, 2021, and disclosing "System and Method for Inter-Arm Registration"), both of which are incorporated by reference.

FIG. 1 also shows field of view 130 of imaging device 114 by indicating a region where imaging device 114 may capture images of workspace 132 and objects and events on or within workspace 132. In the configuration shown in FIG. 1, at least a distal portion of end effector 120 is located within field of view 130 but is obstructed relative to imaging device 114 by repositionable arm 112. Further as shown, end effector 120 is facing away from imaging device 114. Accordingly, imaging device 114 is unable to capture images of at least the distal portion of end effector 120 and/or one or more features on end effector 120 (e.g., features on the distal portion of end effector 120). Without images of end effector 120 and/or one or more features on end effector 120, there may be a difficulty in establishing vision-based registration between robotic device 110 and imaging device 114 that is effective for controlling end effector 120. This is especially important when control of end effector 120 is automated based on images captured by imaging device 114. In various environments in which computer-aided system 100 is located, moving imaging device 114 and/or adding additional imaging devices 114 so that end effector 120 is visible in the field of view of at least one imaging device 114 for registration purposes may be expensive and/or impractical.

To improve on one or more of the above issues, or to improve on other issues, it would be helpful to have one or more techniques that can determine a registration transform between robotic device 110, in particular end effector 120, and imaging device 114, even when end effector 120 is not visible or is obscured in field of view 130 of imaging device 114. This facilitates determination of a registration transform with an existing configuration of computer-aided system 100, so that the need to add significant additional equipment to and/or to reconfigure computer-aided system 100 for registration transform determination purposes is reduced or eliminated.

Accordingly, a technique for determining a registration transform between robotic device 110 and imaging device 114 includes determining a registration transform between robotic device 110 and imaging device 114 using a set of registration indicators provided in multiple indicator poses in workspace 132. The registration indicators are provided in various indicator poses within workspace 132 by robotic device 110 and captured in images by imaging device 114. In various examples, control unit 140 controls robotic device 110 to provide a registration indicator in an indicator pose in workspace 132 and determines a pose of robotic device 110 (e.g., in particular, a pose of end effector 120 and/or one or more features thereon) in a reference frame of robotic device 110 (e.g., reference frame r) corresponding to that indicator pose. Control unit 140 can control robotic device 110 to provide multiple registration indicators in multiple indicator poses in workspace 132 (e.g., at different positions in workspace 132). For each of the indicator poses, control unit 140 controls imaging device 114 to capture an image of workspace 132, including the registration indicator in the indicator pose, and processes the captured image to determine the indicator pose in a reference frame of the imaging device (e.g., reference frame c). Control unit 140 then determines a registration transform $^cT_r$ between reference frame r and reference frame c based on the indicator poses in reference frame c and the corresponding poses of robotic device 110 in reference frame r.

In some examples, a registration indicator includes one or more features, and/or one or more markings, on a physical fiducial object. When the physical fiducial object is placed in a pose in workspace 132 (e.g., object 136 at a certain position and/or orientation on work surface 134), the registration indicator (e.g., the features and/or markings on the fiducial object) has a detectable position and/or orientation in workspace 132, as viewed by imaging device 114. An indicator pose includes that position and/or orientation of the registration indicator in workspace 132, from the perspective of imaging device 114. Accordingly, for example, a fiducial object placed in different poses in workspace 132 (e.g., at different positions and/or orientations on work surface 134) results in different registration indicators in indicator poses within the images of workspace 132 captured by imaging device 114. For example, each of the indicator poses could be obtained by placing the fiducial object at different positions with the same orientation, at a same position with different orientations, or at different positions and orientations on work surface 134. In some examples and without limitation, each of the indicator poses includes positions/orientations in at least four degrees of freedom in the reference frame of imaging device 114 (x, y, z, rotation/roll about z). In other examples, the indicator poses may include fewer and/or more degrees of freedom than the x, y, z and roll about z as depicted in the examples of FIG. 1.

Control unit 140 controls robotic device 110 to place the fiducial object in various indicator poses in workspace 132, in any technically feasible manner, including but not limited to picking up and releasing the fiducial object (e.g., via a grasping grip, via vacuum suction/release), pushing the fiducial object, or pulling the fiducial object. The indicator poses may differ in position, orientation, or both position and orientation. More generally, control unit 140 controls robotic device 110 to move the fiducial object in a manner that, once the fiducial object is moved to a desired indicator pose, robotic device 110 can release the fiducial object in workspace 132 without disturbing the fiducial object. Accordingly, robotic device 110 can, for example, release the fiducial object while the fiducial object is in contact with work surface 134 instead of releasing and dropping the fiducial object onto work surface 134 while the fiducial object is elevated above work surface 134. In some embodiments, workspace 132 includes an area reserved as a staging area for the fiducial object prior to placement of the fiducial object in an indicator pose. The fiducial object can be placed and stored in the staging area when not in use and can be moved from the staging area to begin a process to determine the registration transform.

In some examples, the fiducial object has a shape roughly similar to that of a circular disk, with one or more features thereon that can be captured in an image and recognized via image recognition techniques. In some other examples, the fiducial object can have a shape roughly similar to that of a square or rectangular disk, a cylinder, and/or the like. In some examples, the fiducial object is relatively rigid and has a relatively large mass compared to forces anticipated to be applied to the fiducial object, to further reduce the likelihood of the fiducial object being translated, rotated, deformed, or otherwise disturbed after being released by robotic device 110. Further, in some examples, the fiducial object and/or features thereon are configured for accurate and repeatable recognition in images that capture the features. For example, the features can be high-contrast to facilitate improved vision recognition (e.g., high-contrast edges; shapes, patterns, and/or colors that facilitate higher resolution and/or greater recognition accuracy); and/or distinct appearances relative to other nearby features and/or work surface 134). For example, the body of the fiducial object could have a bead blast finish on stainless steel. As another example, holes could be formed into the fiducial object and filled with a background that provides a high contrast relative to the surrounding material and/or features on the fiducial object.

In various examples, the fiducial object includes one or more fiducial features that correspond to one or more features on the distal end of end effector 120. For example, the fiducial object could include features that mirror the positions of corresponding features on end effector 120. The fiducial object could also include one or more features that end effector 120 can use to grab and hold on to the fiducial object (e.g., a feature on end effector 120 mates with a corresponding feature on the fiducial object to grab the fiducial object). Accordingly, the fiducial object need not have the same cross-sectional shape as end effector 120 (e.g., if end effector 120 has a circular cross-section, the fiducial object need not have a matching circular cross-section). Additionally, a feature can be shape-defining or non-shape defining. As used herein, a shape defining feature is one that helps to define part or all of the shape of the object. Examples of shape defining features of an object include the external shape of part or all of the object, a hole or opening or notch in the object, a protrusion of the object such as a tab, and/or the like. A non-shape defining feature includes any indicium on the fiducial object that is not part of the physical structure of the object. Examples of non-shape defining indicia include markings on the object (e.g., printed text or graphics, patterns on stickers applied to the object, etc.). An example of a distal end of end effector 120 is described in further detail below with respect to FIG. 5. Examples of fiducial objects are described in further detail below with respect to FIGS. 6-7.

When robotic device 110 has placed the fiducial object at an indicator pose in workspace 132, before robotic device 110 releases the fiducial object or moves further, control unit 140 determines and/or records a pose of robotic device 110 in the reference frame of robotic device 110 (e.g., reference frame r); the determined/recorded pose of robotic device 110 corresponds to the indicator pose. The pose of robotic device 110 includes the position(s) and/or orientation(s) of repositionable arm 112 and/or end effector 120, as known or expected by control unit 140 that controlled robotic device 110 to place the fiducial object. In some examples, the pose of robotic device 110 further includes the position(s) and/or orientation(s) of one or more features on end effector 120. After determining and/or recording the pose of robotic device 110, control unit 140 can control robotic device 110 to move end effector 120 away from workspace 132 without disturbing the fiducial object, clearing field of view 130 for imaging device 114 to capture an image of workspace 132, including the fiducial object. In some examples and without limitation, the pose of robotic device 110 includes positions/orientations in at least four degrees of freedom in the reference frame of robotic device 110 (x, y, z, rotation/roll about z). Hereinafter, for convenience, a pose of robotic device 110 may be referred to as a "robotic device pose."

In some other examples, an indicator pose with a registration indicator can be provided by robotic device 110 (in particular, end effector 120) making markings on a medium (e.g., paper) placed in workspace 132 (e.g., on work surface 134). In some examples, the medium can be a touch and/or pressure sensitive medium, such as pressure paper or carbon paper. The markings are made by one or more features on end effector 120 (e.g., features on the distal end of end effector 120) applying pressure on the medium and/or applying a material, such as ink, to the medium. Control unit 140 can control robotic device 110 to move end effector 120 to a position over the medium in workspace 132 and to apply the pressure and/or material to the medium. Before control unit 140 controls robotic device 110 to release end effector 120 from the medium, control unit 140 determines and/or records the robot pose of robotic device 110, similar to that described above. After determining and/or recording the robot pose of robotic device 110, control unit 140 controls robotic device 110 to move end effector 120 away from workspace 132 without disturbing the markings or the medium, clearing field of view 130 for imaging device 114 to capture an image of workspace 132, including the markings on the medium. An example of a marking made by end effector 120 on a medium is described in further detail below with respect to FIG. 10.

In some examples, providing the indicator pose includes rotating end effector 120 about axis 138. In examples where the indicator pose is provided via a fiducial object, robotic device 110 can rotate end effector 120 about axis 138 while end effector 120 is holding on to the fiducial object. In examples where the indicator pose is provided via markings made by end effector 120, robotic device 110 can rotate end effector 120 about axis 138 and then apply pressure onto the medium on work surface 134 to make a marking.

After imaging device 114 has captured an image of an indicator pose, control unit 140 (e.g., control module 170) processes the image to recognize the registration indicator (e.g., features and/or markings on the fiducial object, marking made by end effector 120 on the medium in workspace 132) in the image. Using the recognized registration indicator, control module 170 determines the indicator pose (e.g., position(s) and orientation(s) of the registration indicator in workspace 132) in the reference frame of imaging device 114. In some examples, the indicator pose includes positions and/or orientations of one or more features or portions of markings recognized in the image. In some examples, the orientation of features and/or markings is determined about the z axis of reference frame c. In some examples, the indicator pose can further include a position of a center or centroid of the registration indicator (e.g., a center or centroid of the fiducial object and/or markings as captured in the image). The center or centroid of the registration indicator can correspond to a central axis or an axis of rotation of end effector 120 (e.g., axis 138).

To determine the registration transform, multiple indicator poses and corresponding robotic device poses can be provided and/or determined. In some examples, for determining the translational aspect of the registration transform (e.g., along x and y axes in a planar Cartesian coordinate system), a minimum of three indicator poses with different positions are provided and corresponding robotic device poses are determined. Accordingly, control unit 140 can control robotic device 110 to provide at least three indicator poses and determine/record a corresponding robotic device pose for each of those indicator poses. For example, robotic device 110 could place the fiducial object at one position on work surface 134, determine the indicator pose and robotic device pose at that position, move the fiducial object to another position on work surface 134, determine the indicator pose and robotic device pose at that position, and so on. In some examples, more indicator poses, and corresponding robotic device poses can further enhance the accuracy (e.g., fit between the reference frames) of the transform and reduce the effects of measurement errors on the registration transform. In some examples, nine indicator poses (e.g., at nine different positions on work surface 134) are provided and corresponding robotic device poses are determined/recorded for determining the translational aspect of the registration transform. An example of indicator poses associated with a translational aspect is described in further detail below with respect to FIG. 8. In some examples, when determining the translational aspect for a 3D registration transform, a minimum of four indicator poses are provided.

In some examples, for determining the orientational aspect of the registration transform, including an offset (e.g., a difference between (i) the position of a geometric center, a centroid, some other center, or some other characteristic feature of a distal cross-section of end effector 120 and (ii) the axis 138 used by robotic device 110 to rotate end effector 120), a minimum of two indicator poses are provided and corresponding robotic device poses are determined. In some examples, indicator poses associated with the orientational aspect are separate from indicator poses associated with the translational aspect. Thus, for example, the fiducial object could be picked up by end effector 120 and rotated about the z-axis at the same position on work surface 134 to provide the orientational indicator poses. In some other examples, an indicator pose can be associated with the translational aspect and the orientational aspect. For example, the fiducial object can be moved and rotated relative to a previous indicator pose. Again, more indicator poses, and corresponding robotic device poses can further enhance the accuracy and reduce the error in the registration transform. In some examples, twelve indicator poses (e.g., at twelve different orientations about the z-axis) are provided and corresponding robot poses are determined for determining the orientational aspect of the registration transform. In some examples, for different rotational degrees of freedom, robotic device 110 can provide separate sets of indicator poses. An example of indicator poses associated with an orientational aspect is described in further detail below with respect to FIG. 9. In some examples, when determining the orientational aspect for a 3D registration transform, a minimum of three indicator poses are provided.

In some examples, for a given indicator pose (e.g., the same position and/or orientation of the fiducial object and/or marking on the medium), imaging device 114 can capture multiple images of workspace 132 with the given indicator pose. Control unit 104 can determine the indicator pose based on an average of the multiple images. By "averaging" the multiple images for the indicator pose, control unit 104 can reduce the noise in the determination of the indicator pose in the reference frame of imaging device 114.

After determining the indicator poses and corresponding robotic device poses, control module 170 can determine a registration transform between the reference frame of imaging device 114 and the reference frame of robotic device 110 (e.g., registration transform $^cT_r$). In general, any geometric transformation can be determined from the multiple indicator poses and corresponding robotic device poses. In some examples, control module 170 can determine an affine or projective transform between reference frame r and reference frame c. Control module 170 can optionally further determine a correction for radial distortion in the optics of imaging device 114, an axial offset between end effector 120 and axis 138, and/or one or more feature offsets between a feature of end effector 120 (e.g., a feature on end effector 120 specifically relevant to the functionality of end effector 120) and a reference point within reference frame r (e.g., position of a specific feature on end effector 120 within the reference frame or relative to a center point of end effector 120). In some examples, when determining registration transform $^cT_r$, control module 170 can determine a transform for a central axis of end effector 120 and then a transform for each of one or more features on end effector 120. Accordingly, the registration transform can transform to a position and/or orientation for the central axis of end effector 120 and a position and/or orientation for each of one or more features on end effector 120. In some examples, memory 160 stores one or more values of known parameters associated with the fiducial object (e.g., known distance of a feature relative to the central axis, known circumference, diameter, length, and/or width of the fiducial object) that can be obtained from measurements of the fiducial object. Control module 170 can refer to those stored values when determining registration transform $^cT_r$.

After the registration transform is determined, control module 170 can use the registration transform to control robotic device 110. In various examples, when control unit 140 operates robotic device 110 to perform a task in workspace 132 (e.g., to manipulate an object 136 in workspace 132), control unit 140 can operate imaging device 114 to capture an image of workspace 132, including object 136. Control module 170 processes the image to determine a target pose in workspace 132, in the reference frame of imaging device 114 (e.g., reference frame c). The target pose in reference frame c can include a position and/or orientation in workspace 132. If the task is to manipulate an object 136 in workspace 132, the target pose can include a pose of object 136 in workspace 132, where the pose of object 136 can include a position and/or orientation of object 136 in workspace 132.

Control module 170 then determines a target robotic device pose for robotic device 110 in the reference frame of robotic device 110 using the target pose in the reference frame of imaging device 114 and the registration transform. Control module 170 transforms, using the registration transform (e.g., registration transform $^cT_r$), the target pose in reference frame c into a target robotic device pose in reference frame r. The target robotic device pose can also include a target pose of end effector 120 and/or any feature (s) thereon that are relevant to the task (e.g., a feature that mates with object 136 to grab object 136). In some examples, control module 170 can generate commands for operating robotic device 110 based on the target robotic device pose. In some other examples, robotic device 110 generates those commands based on the target robotic device pose. Control unit 140 transmits the target robotic device pose and/or commands for operating robotic device 110 to robotic device 110. Robotic device 110 operates (e.g., moves end effector 120) in workspace 132 based on the commands generated based on the target robotic device pose. An example of a control system for operating end effector 120 is described below with reference to FIG. 2.

Figure 2:
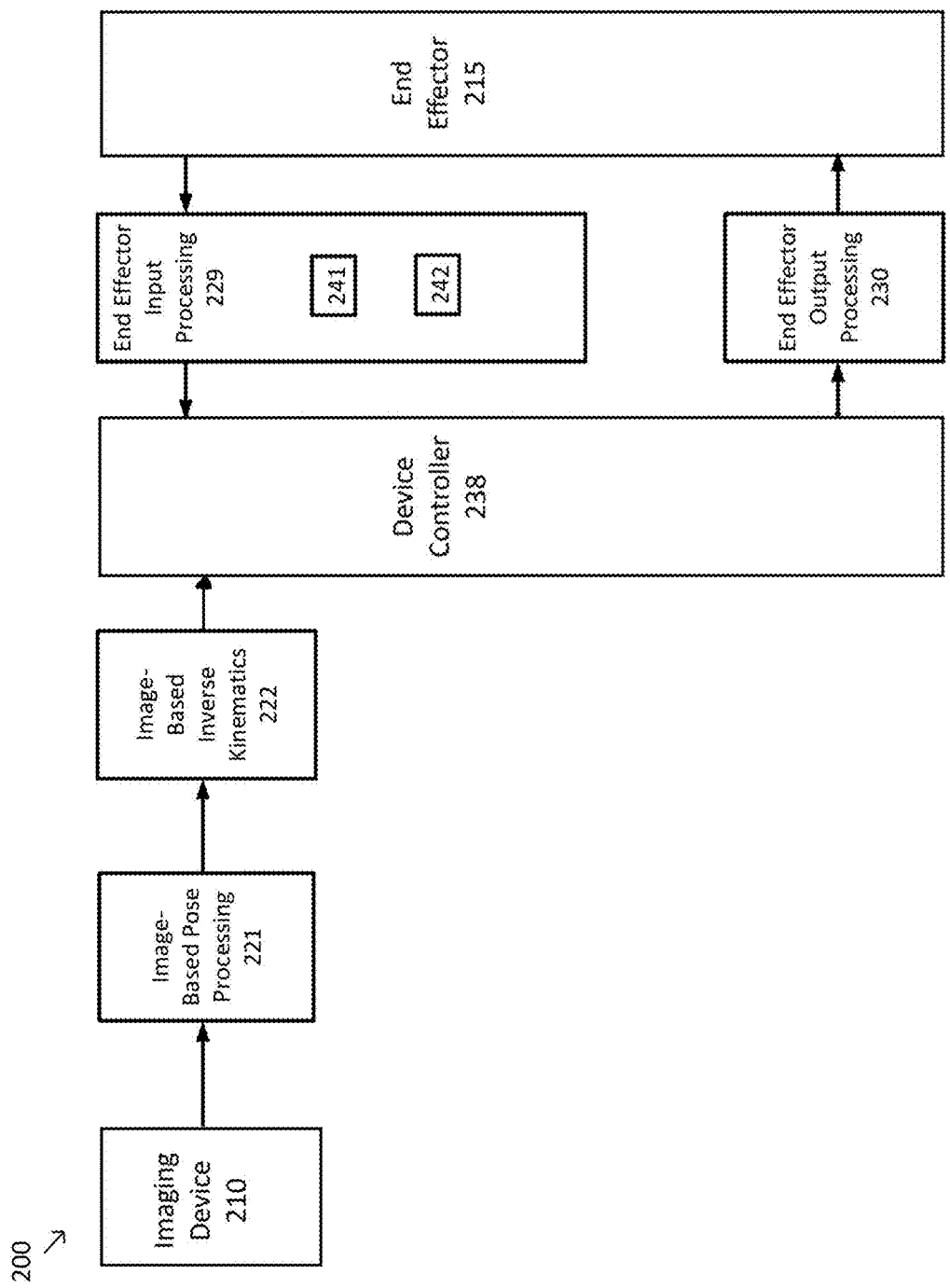
FIG. 2 is a simplified diagram of a control system according to some embodiments.

FIG. 2 is a simplified diagram of a control system 200 according to some embodiments. In some embodiments, control system 200 may be part of control module 170. In some embodiments, control system 200 may be used to control the movement of repositionable arm 112 and/or end effector 120 of FIG. 1. In some examples, the movement may include one or more of a position, an orientation, a pose, motion, and/or the like of repositionable arm 112 and/or end effector 120.

As shown in FIG. 2, control system 200 is shown for control of an end effector 215 using an imaging device 210. In some examples, control system 200, guided by images captured by imaging device 210, automatically controls end effector 215 without human intervention. In some examples, control system 200 may be consistent with control unit 140 and/or control module 170. In some examples, end effector 215 may be consistent with end effector 120 on robotic device 110. In some examples, imaging device 210 may be consistent with imaging device 114. In some examples, control system 200 may be adapted to use multiple imaging devices 210 to control end effector 215. In some examples, control system 200 may be adapted to control two or more end effectors.

An image-based pose processing unit 221 receives one or more images (e.g., still images, video) of the workspace (e.g., workspace 132) captured by imaging device 210. In some examples, images and/or video may be captured by imaging device 210 and sampled at a frame rate of imaging device 210. Image-based pose processing unit 221 processes the images to recognize one or more objects (e.g., end effector 120, object 136) in the image(s) and/or video and to determine the poses of the objects in the image(s) and/or video. Image-based pose processing unit 221 can recognize objects using any technically feasible object recognition technique (e.g., machine learning-based recognition, recognition using reference images, etc.). In various examples, a pose of an object in the images and/or video includes a position and/or orientation of the object in a reference frame of imaging device 210 (e.g., reference frame c).

An image-based inverse kinematics processing unit 222 receives the poses of one or more objects, in the reference frame of imaging device 210, from image-based pose processing unit 221 and determines or generates corresponding target poses and optionally velocities, of end effector 215 in a reference frame associated with end effector 215 (e.g., reference frame r of robotic device 110). In some examples, a pose of end effector 215 includes a position and/or orientation of end effector 215 in the reference frame associated with end effector 215. In some examples, image-based inverse kinematics processing unit 222 determines the corresponding positions and orientations by using the registration transform between the imaging device 114 and the robotic device 110. In some embodiments, an operating mode of control system 200 is to operate end effector 215 using the determined positions and orientations in the reference frame associated with end effector 215 in order to manipulate the one or more objects in the workspace. In some examples, image-based inverse kinematics processing unit 222 takes into account offsets when determining or generating the target poses of end effector 215. The offsets can include an offset that corresponds to a position and/or orientation of a feature on end effector 215 relevant to manipulation of an object in the workspace, and another offset that corresponds to an axial offset between end effector 215 and axis 138. The offsets can be determined as part of determining the registration transform between imaging device 114 and robotic device 110. In some examples, the offsets are part of the registration transform. In some other examples, the offsets are parameters separate from the registration transform.

In some examples, control system 200 can include an optional simulated end effector processing unit that receives the target end effector poses and velocities from image-based inverse kinematics processing unit 222 and can limit the desired end effector pose, velocities, accelerations, and/or the like to assigned limits, such as to enforce correct operation of end effector 215 by keeping joints of the repositionable structure to which end effector 215 is mounted (e.g., the base, repositionable arm 112) within range of motion limits, end effector 215 within the bounds of workspace 132, and/or the like. The simulated end effector processing unit generates simulated end effector states (e.g., positions, velocities, accelerations, and/or the like). In some examples, the simulated end effector states are determined based on a manipulator Jacobian of end effector 215 and/or the repositionable structure to which end effector 215 is mounted.

As image-based pose processing unit 221 is receiving images from imaging device 210, an end effector input processing unit 229 is also receiving end effector positions and orientations from sensors in end effector 215 and the robotic device. In some examples, the end effector positions and orientations are received by end effector input processing unit 229 at a control system processing rate. End effector input processing unit 229 includes an actuator-side input processing unit 241 and a load-side input processing unit 242. Actuator-side input processing using 241 receives arm measurement data (e.g., actuator position and/or orientation, velocity, acceleration, and/or the like data) from actuator-side sensors in end effector 215 and/or the repositionable structure (e.g., the base, repositionable arm 112,). Load-side input processing unit 322 receives link data (e.g., position, motion, and/or the like) of the links in end effector 215 and the repositionable structure from load-side sensors. A device control unit 238 receives the arm measurement data and the link data from end effector input processing unit 229 and optionally the simulated end effector states from a simulated end effector processing unit, and generates device command signals for actuators in end effector 215 and/or the repositionable structure (e.g., the base, repositionable arm 112).

The device command signals are generated by device control unit 238 so as to drive arms of the repositionable structure (e.g., repositionable arm 112,) and/or end effector 215 until feedback errors calculated in device control unit 238 zero out. An end effector output processing unit 230 receives the device command signals from device control unit 238, converts them into appropriate electrical signals, and supplies the electrical signals to actuators of the repositionable structure and/or end effector 215 and/or the repositionable structure so as to drive the actuators accordingly.

Figure 3:
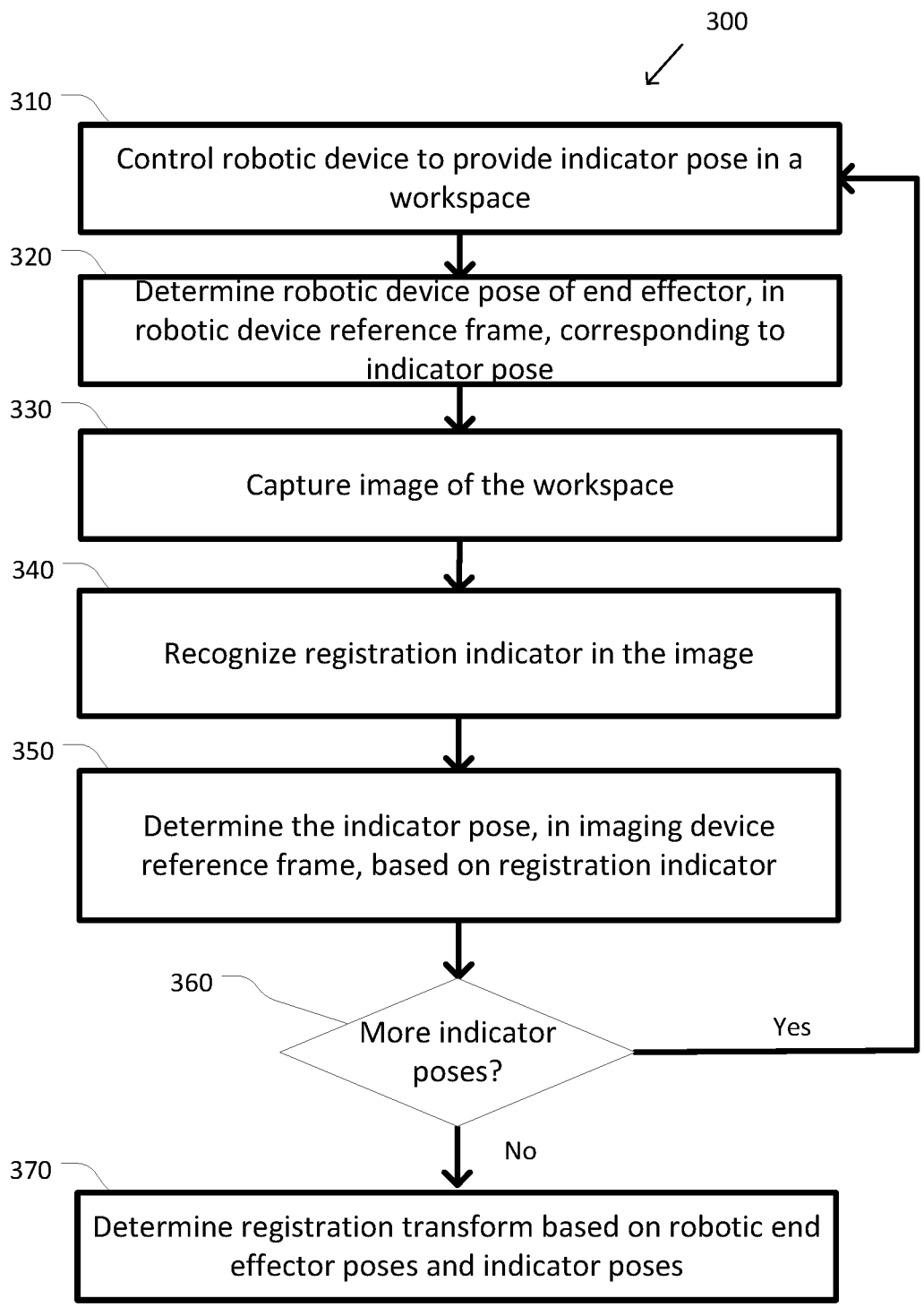
FIG. 3 is a flow diagram of method steps for determining a registration transform using image-based registration according to some embodiments.

FIG. 3 is a flow diagram of method steps for determining a registration transform using image-based registration, according to some embodiments. Although the method steps are described with respect to the systems of FIGS. 1-2, persons skilled in the art will understand that any system configured to perform the method steps, in any order, falls within the scope of the various embodiments. In some embodiments, one or more of the steps 310-370 of method 300 may be implemented, at least in part, in the form of executable code stored on one or more non-transient, tangible, machine readable media that when run by one or more processors (e.g., processor 150) may cause the one or more processors to perform one or more of the steps 310-370.

As shown, method 300 begins at step 310, where a control module 170 controls a robotic device to provide an indicator pose in a workspace. Control module 170 can, for example, operate end effector 120 to provide an indicator pose of a registration indicator in workspace 132 by placing a fiducial object in workspace 132 and/or creating markings on a medium in workspace 132. For example, a robotic device pose command module of control module 170 could command or control robotic device 110 to provide a registration indicator in an indicator pose in workspace 132 within field of view 130 and viewable by imaging device 114.

At step 320, control module 170 determines a pose of an end effector of the robotic device, in a reference frame of the robot, that corresponds to the indicator pose. Control module 170 determines and/or records a robotic device pose of end effector 120, in reference frame r, when the indicator pose is provided (e.g., when the fiducial object is placed, or the marking is made on the medium). After the robotic device pose of end effector 120 is determined, control module 170 can operate robotic device 110 to move end effector 120 away without disturbing the fiducial object or the medium. For example, a robotic device pose determination module of control module 170 could determine a robotic device pose of end effector 120 in reference frame r of robotic device 110, where the robotic device pose of end effector 120 corresponds to the registration indicator in the indicator pose provided in step 310.

At step 330, control module 170 causes an imaging device to capture an image of a workspace. Control module 170 operates imaging device 114 to capture an image of workspace 132, including any indicator pose included therein, and control module 170 could receive the image from imaging device 114. For example, an image receipt module of control module 170 could receive one or more images, captured by imaging device 114, of the registration indicator in the indicator pose provided in step 310.

At step 340, control module 170 recognizes a registration indicator in the image. Control module 170 processes the image captured in step 330 to recognize the registration indicator in the indicator pose captured in the image. Control module 170 can use any technically feasible technique to recognize the registration indicator by recognizing the features (e.g., features on the fiducial object) and/or markings (e.g., markings on the medium) in the image.

At step 350, control module 170 determines the indicator pose, in a reference frame of the imaging device, based on the registration indicator. Control module 170 determines, based on the registration indicator recognized in step 340, the indicator pose in reference frame c of imaging device 114. The indicator pose can include the position and/or orientation of the registration indicator and/or one or more features. For example, an indicator pose determination module of control module 170 could, based on the one or more images of the registration indicator captured in step 330, determine the indicator pose in reference frame c of imaging device 114, where the indicator pose corresponds to the registration indicator provided in step 310.

At step 360, if there are more indicator poses to be provided (360—Yes), then method 300 proceeds back to step 310, where control module 170 can control robotic device 110 to provide another indicator pose. If there are no more indicator poses to be provided (360—No), then method 300 proceeds to step 370, where control module 170 determines a registration transform based on the indicator poses and the robotic device poses of end effector 120. Control module 170 determines a registration transform between reference frame c and reference frame r (e.g., registration transform $^cT_r$) based on the indicator poses determined at step 350 and the robotic device poses determined at step 320. For example, a registration module of control module 170 could determine a registration transform $^cT_r$ between reference frame r and reference frame c based on correspondences between the multiple robotic device poses in reference frame r, determined in step 320, and the multiple indicator poses in reference frame c, determined in step 350.

Figure 4:
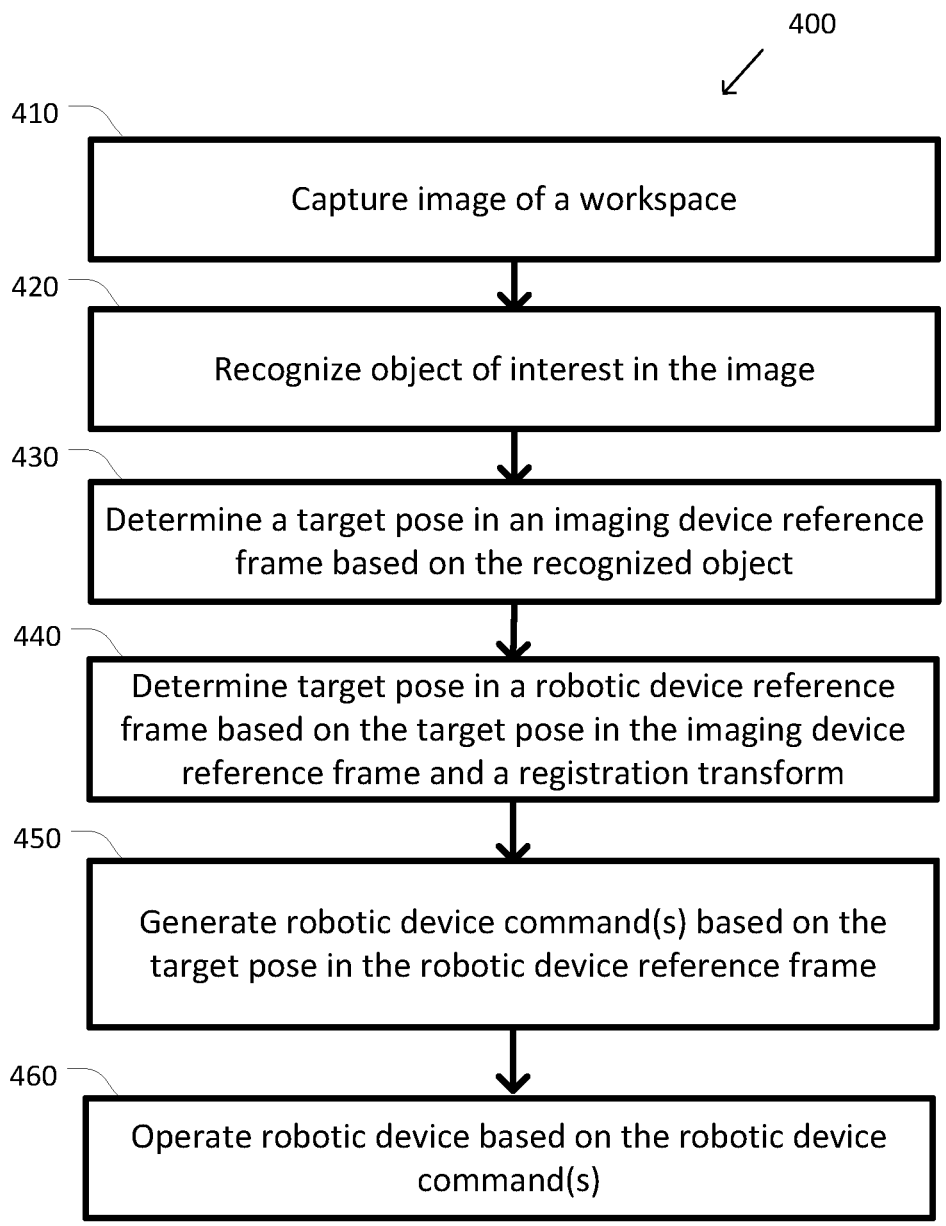
FIG. 4 is a flow diagram of method steps for operating a robotic device based on image-based registration according to some embodiments.

FIG. 4 is a flow diagram of method steps for operating a robotic device based on image-based registration, according to some embodiments. Although the method steps are described with respect to the systems of FIGS. 1-2, persons skilled in the art will understand that any system configured to perform the method steps, in any order, falls within the scope of the various embodiments. In some embodiments, one or more of the steps 410-460 of method 400 may be implemented, at least in part, in the form of executable code stored on one or more non-transient, tangible, machine readable media that when run by one or more processors (e.g., processor 150) may cause the one or more processors to perform one or more of the steps 410-460.

As shown, method 400 begins at step 410, where a control module 170 causes an imaging device to capture an image of a workspace. Control module 170 operates imaging device 114 to capture an image of workspace 132, including any objects 136 included therein. For example, an object 136 could be an object for which manipulation by robotic device 110 is desired. As another example, a first object 136 could be an object onto which a second object 136 is to be mounted on, installed on, placed on, and/or the like. More generally, workspace 132 can include any number of objects 136 for which operation and/or manipulation by robotic device 110 is desired.

At step 420, control module 170 recognizes an object of interest in the image. Control module 170 processes the image captured in step 410 to recognize one or more objects 136 for which operation and/or manipulation by robotic device 110 is desired. Control module 170 can use any technically feasible technique to recognize object(s) 136.

At step 430, control module 170 determines a target pose in a reference frame of the imaging device based on the recognized object(s). Control module 170 determines a target pose, in reference frame c of imaging device 114, corresponding to a pose of an object 136 recognized in step 420.

At step 440, control module 170 determines a target pose in a reference frame of a robotic device based on target pose in the imaging device reference frame and a registration transform. Control module 170 determines a target robotic device pose (e.g., a target pose for end effector 120), in reference frame r, by applying a registration transform between reference frame c and reference frame r (e.g., registration transform $^cT_r$) to the target pose in reference frame c determined in step 430.

At step 450, control module 170 generates one or more robotic device commands based on the target pose in the robotic device reference frame. Control module 170 generates commands, for robotic device 110, that can cause end effector 120 to move into the target robotic device pose in reference frame r.

At step 460, control module 170 operates the robotic device based on the robotic device commands. Control module 170 transmits the commands to robotic device 110 to cause end effector 120 to move into a position and/or orientation in workspace 132 corresponding to the target robotic device pose in reference frame r and to operate on and/or manipulate object(s) 136.

As discussed above and further emphasized here, FIG. 4 is merely an example which should not unduly limit the scope of the claims. One of ordinary skill in the art would recognize many variations, alternatives, and modifications. In some embodiments, method 400 could be adapted to recognize and control a pose of an end effector in order to place a previously grasped object at a target pose within an assembly. In some embodiments, method 400 could be adapted to recognize and control a pose of an end effector in order to turn or rotate an object (e.g., tighten or loosen a screw or bolt, turn a latch, and/or the like).

Turning to FIGS. 5-10, particular examples of the techniques described above will now be described. In some examples, a robotic device 110 with an end effector 120 can be implemented in a manufacturing environment (e.g., in an assembly line). FIGS. 5-10 illustrates one such example implemented for a robot in an assembly line. It should be appreciated that FIGS. 5-10 are merely an example which should not unduly limit the scope of the claims. One of ordinary skill in the art would recognize many variations, alternatives, and modifications. For example, other end effectors, fiducial objects, and/or markings with different features are possible.

Figure 5:
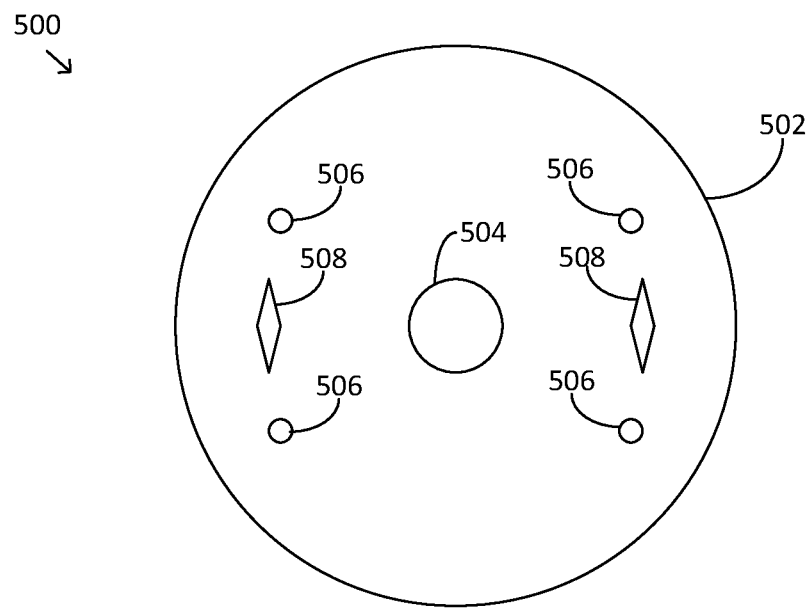
FIG. 5 illustrates a bottom view of a distal end of an example end effector according to some embodiments.

FIG. 5 illustrates a view of a distal end of an end effector according to some embodiments. End effector 500 can be installed at the distal end of an implement mounted on a robotic device (e.g., robotic device 110). End effector 500 has a distal end that faces a work surface (e.g., work surface 134). End effector 500 can be configured to manipulate (e.g., pick up, carry, release, rotate) components for assembly in the assembly line.

End effector 500 includes an outer boundary 502. As shown, end effector 500 is circular at the distal end and outer boundary 502 is accordingly circular. End effector 500 also includes a central hole 504 through which a shaft can be inserted (e.g., a shaft running through a robotic arm onto which end effector 500 is mounted).

End effector 500 further includes features relevant to the task for which end effector 500 is implemented. As shown, end effector 500 includes two elements 508 that can be used to mate with a component to pick up and hold the component (e.g., via vacuum suction and via friction between element 508 and the component at the mating point). Each one of elements 508 can mate with a corresponding portion of the component; end effector 500 can mate with up to two units of the component at a time via the two elements 508 shown where each unit of the component has one corresponding mating portion. End effector 500 can also include holes 506 that house plunger elements (not shown). The plunger elements can facilitate release of units of the component that are held by end effector 500 (e.g., the plunger element can push the component away from end effector 500).

It should be appreciated that FIG. 5 is merely an example which should not unduly limit the scope of the claims. One of ordinary skill in the art would recognize many variations, alternatives, and modifications. For example, other end effectors may include more or fewer, and/or different, features than those described above with respect to FIG. 5. Further, other end effectors may have different shapes and/or configurations than those described above with respect to FIG. 5. As a specific example, an end effector may pick up and hold an object by mechanically grasping the object with grasping jaws and/or the like.

Figure 6:
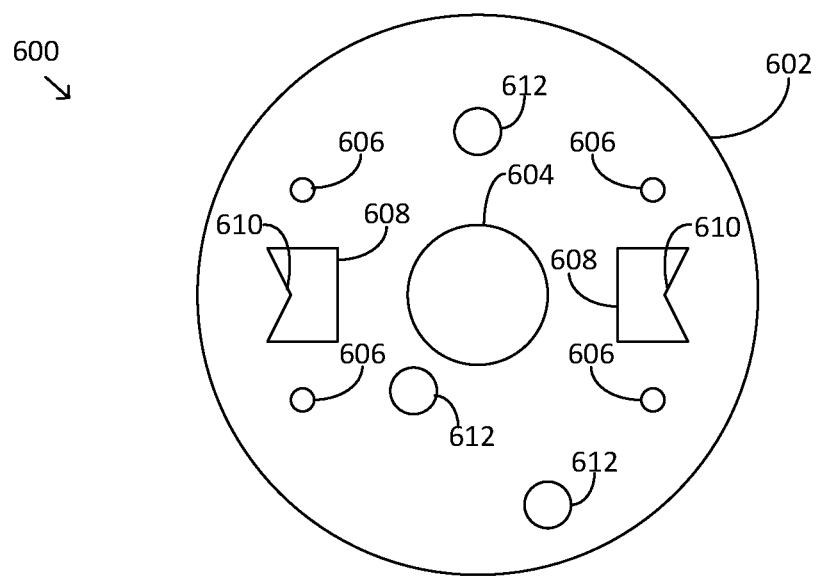
FIG. 6 illustrates a top view of an example fiducial object associated with the end effector of FIG. 5, according to some embodiments.

FIG. 6 illustrates a top view of an example fiducial object associated with the end effector of FIG. 5, according to some embodiments. In some examples, fiducial object 600 is a disk or cylinder. The top view of fiducial object 600, shown in FIG. 6, faces the distal end of end effector 500 shown in FIG. 5.

Fiducial object 600 includes features that correspond to features on end effector 500 and/or aid in recognition in images of fiducial object 600. Fiducial object 600 includes an outer boundary 602 and a feature 604 comprising a central hole. Fiducial object 600 also includes a set of holes 612 that are asymmetrically distributed on fiducial object 600; holes 612 aid in recognition of fiducial object 600 and determination of the orientation of fiducial object 600.

Fiducial object 600 also includes holes 606 that correspond to the plunger elements in end effector 500; the plunger elements can be inserted into holes 606 to aid in alignment between end effector 500 and fiducial object 600. Fiducial object 600 further includes openings 608, each of which includes a protrusion 610. Openings 608, and in particular protrusions 610, correspond to the positions of elements 508 on end effector 500.

Figure 7:
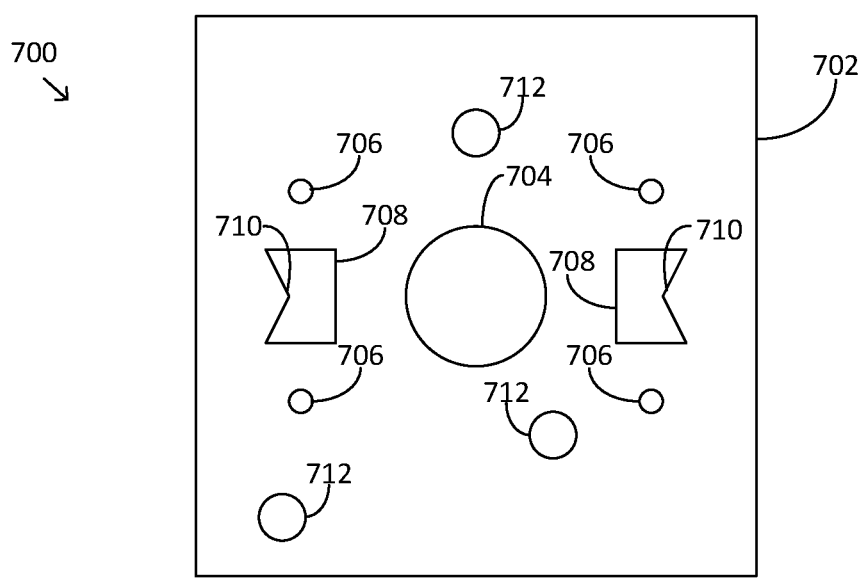
FIG. 7 illustrates a top view of another example fiducial object associated with the end effector of FIG. 5, according to some embodiments.

FIG. 7 illustrates a top view of another example fiducial object associated with the end effector of FIG. 5, according to some embodiments. Fiducial object 700 is similar to fiducial object 600, with the difference being that fiducial object 700 is square-shaped, with a square-shaped outer boundary 702. Features 704 through 712 are similar to features 604 through 612, respectively, described above.

It should be appreciated that FIGS. 6-7 are merely examples which should not unduly limit the scope of the claims. One of ordinary skill in the art would recognize many variations, alternatives, and modifications. For example, other fiducial objects may include more or fewer, and/or different, features and/or markings than those described above with respect to FIGS. 6-7. Further, other fiducial objects may have different shapes, configurations, and/or distribution of features on the fiducial object than those described above with respect to FIGS. 6-7. For example, a fiducial object could have indicia (e.g., letters, numbers, symbols, tabs, notches, location markers, and/or the like). Those indicial could be etched or printed onto the fiducial object, for example. As another example, a fiducial object can have cross or reticle markers indicating positions corresponding to certain features on the end effector. Even further, a fiducial object may have one or more features and/or indicia suitable for the translational aspect (e.g., suitable for determining a translational position), and one or more other features and/or indicia suitable for the orientational aspect (e.g., suitable for determining a rotation).

Figure 8:
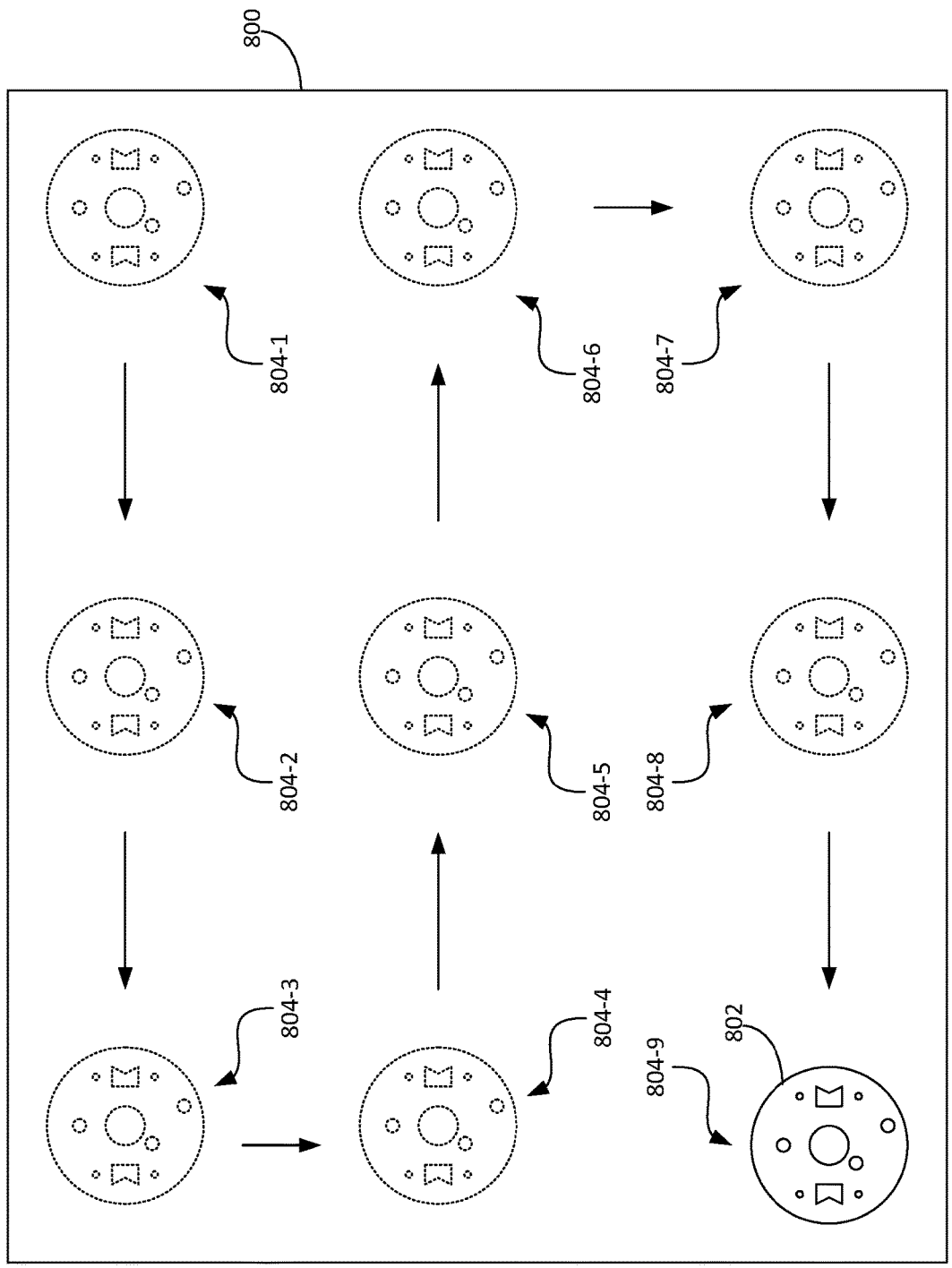
FIG. 8 illustrates an example set of indicator poses for image-based registration according to some embodiments.

As described above, robotic device 110 can provide multiple indicator poses by placing a fiducial object at various indicator poses in workspace 132. FIG. 8 illustrates an example set of indicator poses for image-based registration according to some embodiments. As illustrated in FIG. 8, a work surface 800 is shown in a top view such as that would be seen from the perspective of imaging device 114 with field of view 130 directed at work surface 134. A fiducial object 802 can be placed at each position in a sequence of positions 804 on an x-y plane of the workspace (e.g., work surface 800); an indicator pose is provided at each position 804. For example, control unit 140 could control end effector 120 to place fiducial object 802 first at position 804-1 and determine the robotic device pose at that position. Then, control unit 140 controls end effector 120 to move away from position 804-1 and controls imaging device 114 to capture an image of work surface 800 with fiducial object 802 at position 804-1. Control unit 140 then controls end effector 120 to place fiducial object 802 next at position 804-2 and determine the robotic device pose at that position. Then, control unit 140 controls end effector 120 to move away from position 804-2 and controls imaging device 114 to capture an image of work surface 800 with fiducial object 802 at position 804-2. Control unit 140 can control end effector 120 and imaging device 114 to repeat this sequence of operations through the sequence of positions 804-3 thru 804-9. Control unit 140 can determine the indicator poses at positions 804 from the captured images, and to determine at least a translational aspect of a registration transform from the indicator poses and the robotic device poses. In some examples, positions 804, and the sequence thereof, are predetermined (e.g., pre-configured by an administrator of computer-aided system 100). In some other examples, positions 804 and/or the sequence thereof are randomly selected and/or determined by control unit 140. In some further examples, positions 804 and/or the sequence thereof are dynamically determined (e.g., based on a convergence of registration estimates). For example, if the error in the registration transform is still high (e.g., above a threshold) after processing a first predetermined number of indicator poses, then a second predetermined number of additional indicator poses (e.g., with one or more additional positions 804 and/or one or more additional orientations) could be added and provided, or indicator poses can be added and provided until the registration estimate converges to an acceptable level. It should be appreciated that while nine positions 804 are shown, there can be more or fewer positions, with a minimum number of positions, for which indicator poses are provided.

Figure 9:
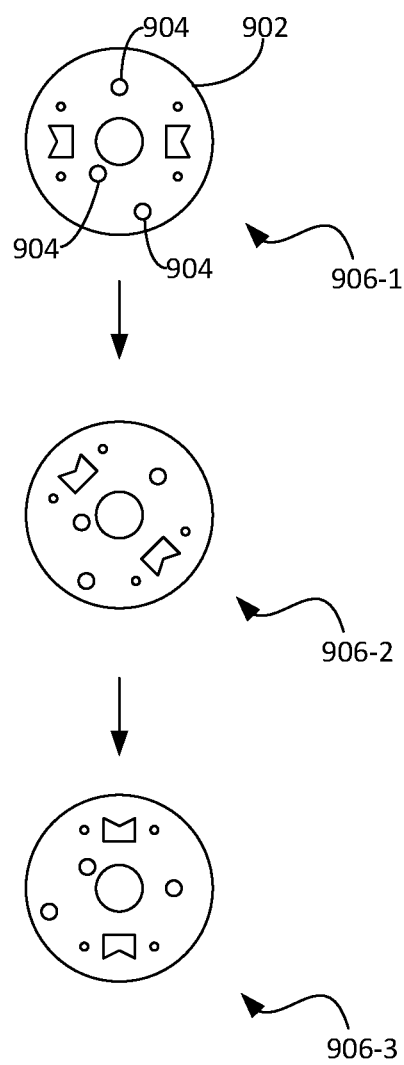
FIG. 9 illustrates another example set of indicator poses for image-based registration according to some embodiments.

As described above, a number of indicator poses can be provided for determining the orientational aspect of the registration transform and/or an axial offset. Accordingly, robotic device 110 can rotate end effector 120 about axis 138 to rotate a fiducial object held by end effector 120 before placement of the fiducial object onto work surface 134. The fiducial object can be rotated over the same x-y position on work surface 134. FIG. 9 illustrates another example set of indicator poses for image-based registration according to some embodiments. In particular, FIG. 9 illustrates a set of indicator poses of a fiducial object 902 that is rotated over the same x-y position on a work surface (e.g., work surface 800).

Fiducial object 902, for which a top view is shown in FIG. 9, includes a set of holes 904 (e.g., holes 612) that are asymmetrically distributed on fiducial object 902, similar to fiducial object 600. Holes 904 aid in the determination, by control unit 140, of change in the orientation of fiducial object 902. Fiducial object 902 can be placed in a first indicator pose on the work surface with an initial orientation 902-1. Control unit 140 can determine the robotic device pose at orientation 902-1 and control imaging device 114 to capture an image of fiducial object 902 at orientation 906-1. Control unit 140 can then control end effector 120 to pick up fiducial object 902, rotate fiducial object 902 to a second indicator pose with a second orientation 906-2, and then release fiducial object 902 without disturbing fiducial object 902. Control unit 140 can determine the robotic device pose at orientation 902-2 and control imaging device 114 to capture an image of fiducial object 902 at orientation 906-1. After imaging device 114 captures an image of fiducial object 902 at orientation 906-2, control unit 140 can then control end effector 120 to pick up fiducial object 902, rotate fiducial object 902 to a third indicator pose with a third orientation 906-3, and then release fiducial object 902 without disturbing fiducial object 902. Control unit 140 can determine the robotic device pose at orientation 902-3 and control imaging device 114 to capture an image of fiducial object 902 at orientation 906-3. The changes in orientation 906 between the indicator poses can be recognized by control unit 104 from the changes in the orientation of the pattern of holes 904 and/or other feature(s) on fiducial object 902 in the images.

While FIGS. 8 and 9 illustrate the use of one fiducial object throughout a set of indicator poses in a registration process, it should be appreciated that, in some embodiments, multiple fiducial objects of different sizes, shapes, features, and/or the like can be used in the registration process. For example, one fiducial object could be used for determining the translational aspect of the registration transform and another fiducial object could be used for determining the orientational aspect and/or offset of the registration transform. As another example, one fiducial object could be used for one subset of indicator poses within the registration process and another fiducial object could be used for another subset of indicator poses within the registration process.

Figure 10:
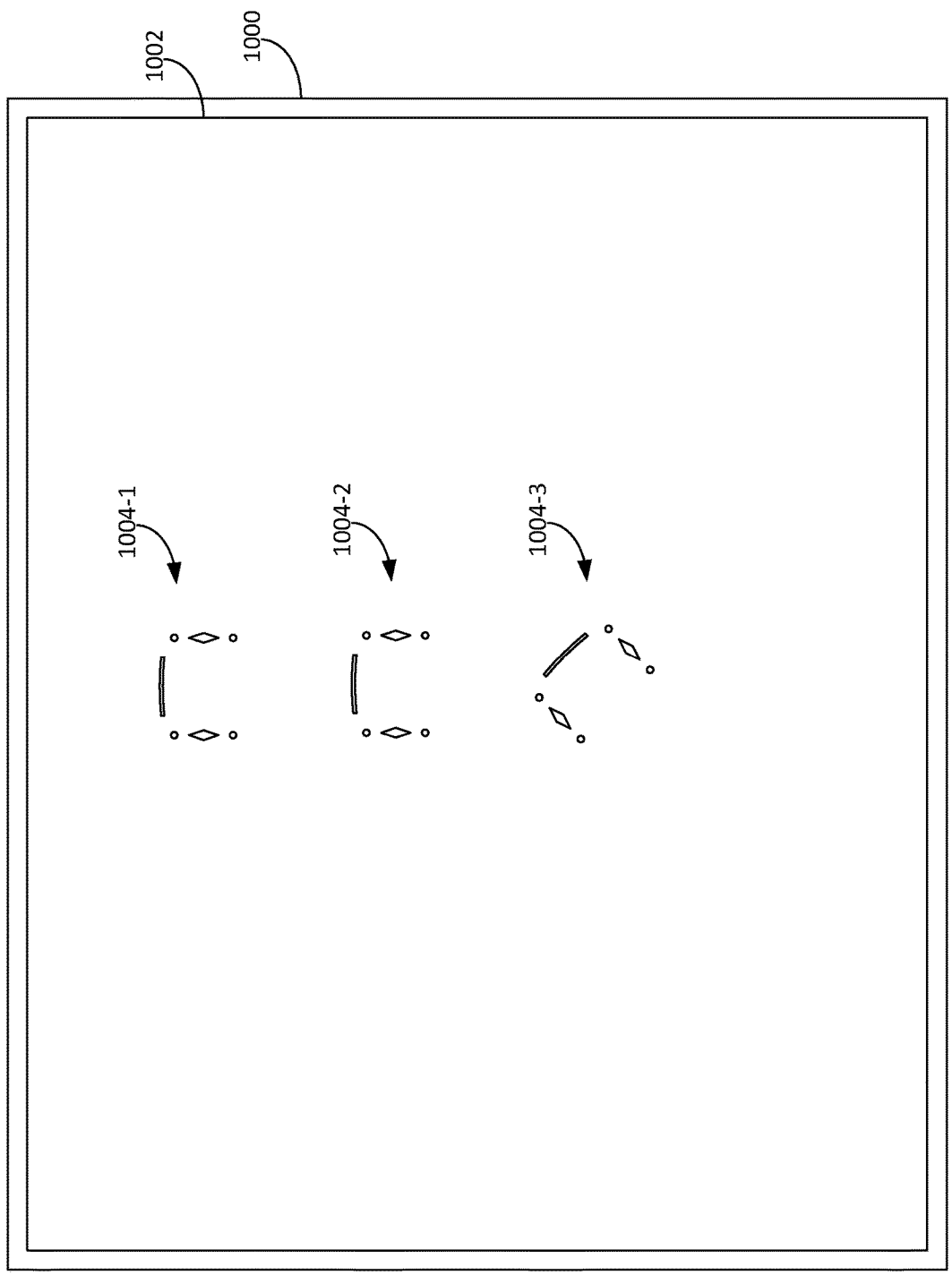
FIG. 10 illustrates an example of a registration indicator marking made on a medium, according to some embodiments.

In some examples, an indicator pose can include a marking made by an end effector 120 on a medium in workspace 132. FIG. 10 illustrates an example of registration indicator markings made on a medium, according to some embodiments. As shown, a medium 1002 (e.g., paper) is placed on work surface 1000. Markings 1004 is made by an end effector on medium 1002 (e.g., by applying pressure and/or a material onto the medium) and different positions and/or orientations of the end effector. Each marking 1004 includes elements that are made on medium 1002 by features on the end effector that can contact and apply pressure to and/or the material (e.g., an ink) on medium 1002. Accordingly, markings 1004 can include fewer elements than a fiducial object or an image of the fiducial object. Further, in some examples, multiple markings 1004 could be made on medium 1002, and corresponding robotic poses determined/recorded, before an image of medium 1002 and markings 1004 are captured; the image would include multiple indicator poses of the multiple markings 1004. As shown, markings 1004 include markings 1004-1 and 1004-2 that have different positions and the same orientation.

Further, robotic device 110 can rotate end effector 120 about axis 138 to change the orientation of end effector 120 about axis 138 (e.g., over a different x-y position on work surface 134) before making a marking on medium 1002 in workspace 132, in order to make markings with end effector 120 at different orientations as well as different positions on the medium. Accordingly, the end effector associated with marking 1004 can be moved to a different position over medium 1002 and rotated before making another marking 1004. Similar to the above, an image of medium 1002 could include multiple markings 1004 in different poses having different positions and orientations. As shown, markings 1004 include a marking 1004-3 that have a different position and orientation than marking 1004-1 or 1004-2.

In some examples, a marking made by end effector 120 on the medium can include a single contiguous element, or multiple elements that differ in shape and/or size from each other. In some examples, physical features of the end effector configured for other purposes (e.g. protrusions used for alignment or manipulation, etc.) are also used to produce the markings used by the registration process. In some examples, an end effector 120 is designed with physical features specifically for making markings for the registration process. In some examples, end effector 120 can couple with an attachment, extension, and/or the like for use during the registration process. The attachment, extension, and/or the like could make certain identifiable types of markings on the medium. In some embodiments, an end effector 120 can produce markings having different sizes and/or different elements at different positions and/or orientations within a registration process.

In some examples, a registration indicator (e.g., a fiducial object, a marking made by end effector 120) can have rotational and/or mirror symmetry. For example, a fiducial object could have features distributed on the fiducial object that result in symmetrical, mirror-image halves on the fiducial object. As another example, a fiducial object could have features distributed on the fiducial object that result in the fiducial object having a rotation symmetry of order 2 or more.

In sum, a technique for performing registration between an imaging device and a robot includes registration based on registration indicators. A robotic device provides respective registration indicators in respective indicator poses in a workspace. The indicator poses can be provided via a fiducial object placed into the workspace by the robotic device or via markings made in the workspace by the robotic device. For each of the indicator poses, a computing system determines a robotic device pose of a portion of the robotic device in a reference frame of the robotic device, obtains an image of the registration indicator in the indicator pose via an imaging device, and determines the indicator pose in a reference frame of the imaging device. The computing system determines a registration transform between the robotic device reference frame and the imaging device reference frame based on the robotic device poses in the robotic device reference frame and the indicator poses in the imaging device reference frame.

At least one advantage and technical improvement of the disclosed techniques is that registration between an imaging device and a robotic device, in particular an end effector of the robotic device, in a workspace environment can be performed even when the end effector is at least partially obscured from the imaging device and/or features of the end effector most relevant to the registration are facing away from the imaging device. Accordingly, registration between the imaging device and the robotic device can be performed with reduced or eliminated need to add additional physical components or complexity, thereby improving the ability to use the imaging device for other purposes associated with the workspace environment. Additionally, the need for significant additional or modified equipment, or physical reconfiguration of the workspace environment, to accommodate the registration process is reduced or eliminated. These technical advantages provide one or more technological advancements over prior art approaches.

Any and all combinations of any of the claim elements recited in any of the claims and/or any elements described in this application, in any fashion, fall within the contemplated scope of the present disclosure and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module," a "system," or a "computer." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-aided system comprising:
an imaging device;
a robotic device that is separate from the imaging device, wherein movement of the robotic device does not move the imaging device; and
a control system comprising one or more processors, the control system configured to:
control the robotic device to provide a first registration indicator at a first location separate from the robotic device and having a first indicator pose in a workspace,
determine a first robotic device pose of a portion of the robotic device in a robotic device reference frame of the robotic device, the first robotic device pose corresponding to the first indicator pose,
obtain, using the imaging device, a first image of the first registration indicator,
determine, based on the first image, the first indicator pose in an imaging device reference frame of the imaging device,
control the robotic device to provide a second registration indicator at a second location separate from the robotic device and having a second indicator pose in the workspace,
determine a second robotic device pose of the portion of the robotic device in the robotic device reference frame, the second robotic device pose corresponding to the second indicator pose,
obtain, using the imaging device, a second image of the second registration indicator,
determine, based on the second image, the second indicator pose in the imaging device reference frame, and
determine a registration transform between the robotic device reference frame and the imaging device reference frame based on a first correspondence between the first robotic device pose in the robotic device reference frame and the first indicator pose in the imaging device reference frame, and a second correspondence between the second robotic device pose in the robotic device reference frame and the second indicator pose in the imaging device reference frame.

2. The computer-aided system of claim 1, wherein the registration transform comprises one or more parameters, each of the one or more parameters being selected from the group consisting of:
parameters for a relative translation between the robotic device reference frame and the imaging device reference frame; and
parameters for a relative rotation between the robotic device reference frame and the imaging device reference frame.

3. The computer-aided system of claim 1, wherein the first robotic device pose and the second robotic device pose differ in an angle of rotation of the portion of the robotic device about a rotation axis of the robotic device, and wherein the registration transform accounts for an offset between a center of the portion of the robotic device and the rotation axis.

4. The computer-aided system of claim 1, wherein the robotic device in the first robotic device pose occludes at least a part of the first registration indicator from being viewed by the imaging device, and wherein the control system is further configured to:

cause, after providing the first registration indicator, at least the portion of the robotic device to move away from occluding the part of the first registration indicator from being viewed by the imaging device.

5. The computer-aided system of claim 1, wherein the portion of the robotic device comprises an end effector, and wherein the first robotic device pose in the robotic device reference frame comprises a position or an orientation of the end effector in the robotic device reference frame.

6. The computer-aided system of claim 1, wherein:
the control system is configured to provide the first registration indicator by causing the robotic device to move a fiducial object to a first position or orientation corresponding to the first indicator pose; and
the control system is configured to provide the second registration indicator by causing the robotic device to move the fiducial object to a second position or orientation corresponding to the second indicator pose.

7. The computer-aided system of claim 1, wherein:
the first registration indicator comprises a first marking made by the robotic device in the first robotic device pose; and
the second registration indicator comprises a second marking made by the robotic device in the second robotic device pose.

8. The computer-aided system of claim 7, wherein the first marking and the second marking are made by the portion of the robotic device.

9. The computer-aided system of claim 1, wherein the first registration indicator has rotational symmetry or mirror symmetry.

10. The computer-aided system of claim 1, wherein the first registration indicator and the second registration indicator differ in size.

11. A control system for a computer-aided system comprising a robotic device and an imaging device, the control system comprising:
a robotic device pose command module configured to command the robotic device to provide a plurality of registration indicators at locations separate from the robotic device and viewable by the imaging device, wherein each registration indicator of the plurality of registration indicators has an indicator pose, wherein the robotic device is separate from the imaging device, and wherein movement of the robotic device does not move the imaging device;
a robotic device pose determination module configured to determine a plurality of robotic device poses of a portion of the robotic device in a robotic device reference frame of the robotic device, wherein each robotic device pose of the plurality of robotic device poses corresponds to a registration indicator of the plurality of registration indicators;
an image receipt module configured to receive, from the imaging device, one or more images of each registration indicator of the plurality of registration indicators;
an indicator pose determination module configured to, based on the one or more images of each registration indicator of the plurality of registration indicators, determine a plurality of indicator poses in an imaging device reference frame of the imaging device, each indicator pose of the plurality of indicator poses corresponding to a registration indicator of the plurality of registration indicators; and
a registration module configured to determine a registration transform between the robotic device reference frame and the imaging device reference frame based on correspondences between the plurality of robotic device poses in the robotic device reference frame and the plurality of indicator poses in the imaging device reference frame.

12. The control system of claim 11, wherein at least two robotic device poses of the plurality of robotic device poses differ in an angle of rotation of the portion of the robotic device about a rotation axis of the robotic device, and wherein the registration transform accounts for an offset between a center of the portion of the robotic device and the rotation axis.

13. The control system of claim 11, wherein the robotic device in a first robotic device pose of the plurality of robotic device poses occludes at least a part of a first registration indicator of the plurality of registration indicators from being viewed by the imaging device, and wherein the robotic device pose command module is further configured to:
cause, after providing the first registration indicator, at least the portion of the robotic device to move away from occluding the part of the first registration indicator from being viewed by the imaging device.

14. The control system of claim 11, wherein:
at least three indicator poses of the plurality of indicator poses differ in position; and
at least two indicator poses of the plurality of indicator poses differ in orientation.

15. The control system of claim 11, wherein:
the robotic device pose command module is configured to provide the plurality of registration indicators by causing the robotic device to move a fiducial object to a plurality of fiducial poses, wherein each fiducial pose of the plurality of fiducial poses corresponds to an indicator pose of the plurality of indicator poses; or
the plurality of registration indicators comprises a plurality of markings made by the robotic device in the plurality of robotic device poses.

16. A method, comprising:
controlling, by a control system, a robotic device to provide a first registration indicator at a first location separate from the robotic device and having a first indicator pose in a workspace;
determining, by the control system, a first robotic device pose of a portion of the robotic device in a robotic device reference frame of the robotic device, the first robotic device pose corresponding to the first indicator pose;
obtaining, by the control system using an imaging device, a first image of the first registration indicator, wherein the imaging device is separate from the robotic device, wherein movement of the robotic device does not move the imaging device;
determining, by the control system, based on the first image, the first indicator pose in an imaging device reference frame of the imaging device;
controlling, by the control system, the robotic device to provide a second registration indicator at a second location separate from the robotic device and having a second indicator pose in the workspace;
determining, by the control system, a second robotic device pose of the portion of the robotic device in the robotic device reference frame, the second robotic device pose corresponding to the second indicator pose;
obtaining, by the control system using the imaging device, a second image of the second registration indicator;
determining, by the control system based on the second image, the second indicator pose in the imaging device reference frame; and determining, by the control system, a registration transform between the robotic device reference frame and the imaging device reference frame based on a first correspondence between the first robotic device pose in the robotic device reference frame and the first indicator pose in the imaging device reference frame, and a second correspondence between the second robotic device pose in the robotic device reference frame and the second indicator pose in the imaging device reference frame.

17. The method of claim 16, wherein the first robotic device pose and the second robotic device pose differ in an angle of rotation of the portion of the robotic device about a rotation axis of the robotic device, and wherein the registration transform accounts for an offset between a center of the portion of the robotic device and the rotation axis.

18. The method of claim 16, wherein:
the robotic device in the first robotic device pose occludes at least a part of the first registration indicator from being viewed by the imaging device; and
the method further comprises causing, by the control system after providing the first registration indicator, at least the portion of the robotic device to move away from occluding the part of the first registration indicator from being viewed by the imaging device.

19. The method of claim 16, wherein:
the portion of the robotic device comprises an end effector, and wherein the first robotic device pose in the robotic device reference frame comprises a position or an orientation of the end effector in the robotic device reference frame.

20. The method of claim 16, wherein:
providing the first registration indicator comprises causing the robotic device to move a fiducial object to a first position or orientation corresponding to the first indicator pose, and providing the second registration indicator comprises causing the robotic device to move the fiducial object to a second position or orientation corresponding to the second indicator pose; or
the first registration indicator comprises a first marking made by the robotic device in the first robotic device pose, and the second registration indicator comprises a second marking made by the robotic device in the second robotic device pose.

\* \* \* \* \*